(12) United States Patent
    Hawker

(10) Patent No.: US 10,473,688 B2
(45) Date of Patent: Nov. 12, 2019

(54) SENSOR SYSTEM FOR MEASURING A PARAMETER

(71) Applicant: Larry E. Hawker, Waterloo (CA)

(72) Inventor: Larry E. Hawker, Waterloo (CA)

( * ) Notice: Subject to any disclaimer, the term of this patent is extended or adjusted under 35 U.S.C. 154(b) by 348 days.

(21) Appl. No.: 15/473,694

(22) Filed: Mar. 30, 2017

(65) Prior Publication Data
    US 2017/0285065 A1    Oct. 5, 2017

Related U.S. Application Data

(60) Provisional application No. 62/315,954, filed on Mar. 31, 2016.

(51) Int. Cl.
    *G01P 15/18* (2013.01)
(52) U.S. Cl.
    CPC ..................... *G01P 15/18* (2013.01)
(58) Field of Classification Search
    CPC .............................. G01P 15/18; G01C 22/002
    USPC ......................................................... 73/510
    See application file for complete search history.

(56) References Cited

U.S. PATENT DOCUMENTS

| | | | | |
|---|---|---|---|---|
| 6,729,186 B1* | 5/2004 | Sirrine | ................... | G01H 1/003 |
| | | | | 73/593 |
| 2012/0017676 A1* | 1/2012 | Schmid | ................... | G01C 19/56 |
| | | | | 73/504.02 |

* cited by examiner

*Primary Examiner* — Tarun Sinha
(74) *Attorney, Agent, or Firm* — Own Innovation; James W. Hinton

(57) ABSTRACT

The present disclosure provides a sensor system for measuring a parameter of a body. The sensor system includes a housing mountable to a rotating part of the body. The housing includes a first dual-axis accelerometer having a first measurement axis and a second measurement axis, the first dual-axis accelerometer arranged to measure a first acceleration along the first measurement axis and a second acceleration along the second measurement axis and a second dual-axis accelerometer having a third measurement axis and a fourth measurement axis, the second dual-axis accelerometer arranged to measure a third acceleration along the third measurement axis and a fourth acceleration along the fourth measurement axis. The sensor system also includes a processor configured to receive the first, second, third and fourth measured accelerations and determine from the first, second, third and fourth measured accelerations the parameter.

22 Claims, 10 Drawing Sheets

SENSOR SYSTEM FOR MEASURING A PARAMETER

TECHNICAL FIELD

The embodiments disclosed herein relate to an accelerometer-based sensor system and method and, in particular to an accelerometer-based sensor system and method for measuring a parameter of a body.

INTRODUCTION

Typical bicycle cadence meters and speedometers/odometers use a magnet passing a sensor to indicate a complete revolution of the pedal crank arm (for pedaling cadence) or the wheel (for speed/distance). From the elapsed time measured for each complete revolution of the pedal crank arm it is possible to calculate the cadence. From the elapsed time measured for each complete revolution of the wheel (along with the wheel circumference) the speed/distance can be calculated. The cadence and speed/distance can be monitored on various devices (computers, smart phones, cycle computers, etc.) using wired or wireless data transmission (ANT/ANT+, Zigbee or Bluetooth, etc.). These methods provide only the average information throughout the revolution. They do not provide any information about the variation in cadence and speed/distance throughout the revolution.

For typical cycling applications where only the average cadence and speed are used this is sufficient. However, if information about the crank arm position throughout the pedal stroke, and the cadence at those positions, is used (for example, with a power meter that does more than average over the complete revolution) then this is insufficient. Also, transferring the sensors/magnets from one bicycle to another may be time consuming (depending on how they are attached) and the sensors/magnets may become misaligned and stop working until repositioned.

Recent developments have seen the application of an accelerometer (usually at least a dual-axis model) attached to the crank arm (for pedaling cadence) or to the wheel hub (for speed/distance). The signal from the accelerometer varies with the effect of gravity as the crank arm or wheel rotates and can be used to determine when a complete revolution has occurred. This may be done by determining the location of consecutive maximum and minimum extreme values or consecutive changes of polarity of the signals. Along with the elapsed time and wheel circumference the cadence/speed/distance can be calculated. These are then communicated wirelessly to the monitoring device. These developments address two of the issues noted above, namely transferring the devices between bicycles and potential misalignment issues.

However, bicycle cadence meters and speedometers/odometers based on accelerometers are sometimes less accurate than the magnet type at higher cadences and wheel speeds, especially if the accelerometers are positioned further from the center of rotation (for example, the crank bottom bracket or the wheel hub). This is due to the effect of the angular velocity and angular acceleration on the accelerometer signal. Without knowing the magnitude of these effects, the signals due to the gravity effects cannot be isolated and it may not be able to accurately determine when a complete revolution has occurred or the angular position of the pedal crank arm or wheel. Even using the methods described above of determining the location of consecutive maximum and minimum extreme values or consecutive changes of polarity of the signals are inaccurate due to the fact that the angular positions at which these extremes occur are not consistent unless the pedaling cadence is uniform.

Other bicycle cadence meters use a gyroscope mounted to a rotating part of the bicycle such as the crank arm or spider to measure the angular velocity which can be interpreted as cadence. Determining the angular position from the measured angular velocity time samples requires an integration of the velocity signal. Determining the angular acceleration, if needed, from the measured angular velocity time samples requires a differentiation of the velocity signal. However, integration of sampled time data has an inherent inaccuracy due to drift and accumulation errors and in general should be avoided whenever accuracy is desired. Accuracy of the integration process can be improved somewhat by reinitializing the process after each complete revolution of the crank arm but this uses another sensor system such as a magnet and a detection system such as a reed switch or an inductive coil, all of which adds to the cost, weight and complexity of the system.

Clearly there is a need for an improved cadence meter and speedometer/odometer which does not use 1) simplifying assumptions such as uniform cadence, 2) determining the location of consecutive maximum and minimum extreme values or consecutive changes of polarity of the signals, 3) integration or differentiation of the measured sensor signals, and 4) an additional sensor system to reinitialize the integration process to improve accuracy.

SUMMARY

According to one aspect, a sensor system for measuring a parameter of a body is provided. The sensor system includes a housing mountable to a rotating part of the body. The housing includes a first dual-axis accelerometer having a first measurement axis and a second measurement axis, the first dual-axis accelerometer arranged to measure a first acceleration along the first measurement axis and a second acceleration along the second measurement axis and a second dual-axis accelerometer having a third measurement axis and a fourth measurement axis, the second dual-axis accelerometer arranged to measure a third acceleration along the third measurement axis and a fourth acceleration along the fourth measurement axis. The sensor system also includes a processor configured to receive the first, second, third and fourth measured accelerations and determine from the first, second, third and fourth measured accelerations the parameter.

According to another aspect of the system, the parameter is one of angular position, angular velocity and angular acceleration of the rotating part.

According to another aspect of the system, a distance travelled, forward speed or forward acceleration of the body is determined from one or more of the angular position, angular velocity and angular acceleration of the rotating part.

According to another aspect of the system, the body is one of a bicycle, a car, a turbine motor or a Functional Electrical Stimulation (FES) system.

According to another aspect of the system, the body is a bicycle and the rotating part is a crank arm, a wheel, a spider, or a chain ring.

According to another aspect of the system, the first and second axes of the first dual-axis accelerometer are arranged substantially perpendicular to each other and the third and fourth axes of the second dual-axis accelerometer are arranged substantially perpendicular to each other.

According to another aspect of the system, the rotating part is a crank arm and the first axis of the first dual-axis accelerometer is arranged substantially in a radial direction of the crank arm and the second axis of the first dual-axis accelerometer is arranged substantially in a tangential direction of the crank arm.

According to another aspect of the system, the third axis of the second dual-axis accelerometer is arranged substantially in the radial direction of the crank arm and the fourth axis of the second dual-axis accelerometer is arranged substantially in a tangential direction of the crank arm.

According to another aspect of the system, the housing further comprises a wireless transmitter coupled to the first and second dual-axis accelerometers, the wireless transmitter configured to receive the first, second, third and fourth measured accelerations from the first and second dual-axis accelerometers and wirelessly transmit the first, second, third and fourth measured accelerations to the processor.

According to another aspect of the system, the first dual-axis accelerometer is positioned adjacent to an axis of rotation of the rotating part.

According to another aspect of the system, the processor determines the angular position of the rotating part from the first and second measured accelerations of the first dual-axis accelerometer.

According to another aspect of the system, the processor determines the angular velocity of the rotating part from a rate of change of the angular position.

According to another aspect of the system, the processor determines the angular acceleration of the rotating part from a rate of change of the angular velocity.

According to another aspect of the system, the processor determines the angular velocity of the rotating part from the angular position and the third and fourth measured accelerations of the second dual-axis accelerometer.

According to another aspect of the system, the processor determines the angular acceleration of the rotating part from the angular position and the third and fourth measured accelerations of the second dual-axis accelerometer.

According to another aspect, another sensor system for measuring a parameter of a body is provided. The sensor system includes a first housing mountable to the body, the first housing comprising a first dual-axis accelerometer having a first measurement axis and a second measurement axis, the first dual-axis accelerometer arranged to measure a first acceleration along the first measurement axis and a second acceleration along the second measurement axis. The system also includes a second housing mountable to the body, the second housing comprising a second dual-axis accelerometer having a third measurement axis and a fourth measurement axis, the second dual-axis accelerometer arranged to measure a third acceleration along the third measurement axis and a fourth acceleration along the fourth measurement axis and a processor configured to receive the first, second, third and fourth measured accelerations and determine from the first, second, third and fourth measured accelerations the parameter.

According to another aspect of the system, the first housing further includes a first wireless transmitter coupled to the first dual-axis accelerometer and the second housing further comprising a second wireless transmitter coupled to the second dual-axis accelerometer, wherein the first wireless transmitter is configured to receive the first and second measured accelerations from the first dual-axis accelerometer and wirelessly transmit the first and second measured accelerations to the processor and the second wireless transmitter is configured to receive the third and fourth measured accelerations from the second dual-axis accelerometer and wirelessly transmit the third and fourth measured accelerations to the processor.

According to another aspect of the system, the first housing is mounted at a first location to a rotating part of the body and the second housing is mounted at a second location to the rotating part of the body.

According to another aspect of the system, the first housing and the second housing are mounted to a same side of the rotating part.

According to another aspect of the system, the first housing and the second housing are mounted to opposite sides of the rotating part.

According to another aspect of the system, the first housing further includes a first wireless transmitter coupled to the first dual-axis accelerometer and the second housing further comprising a second wireless transmitter coupled to the second dual-axis accelerometer, and a receiver, wherein the first wireless transmitter is configured to receive the first and second measured accelerations from the first dual-axis accelerometer and wirelessly transmit the first and the second measured accelerations to be received by the receiver, and the second wireless transmitter is configured to receive the first and second measured accelerations from the receiver, receive the third and fourth measured accelerations from the second dual-axis accelerometer and transmit the first, second, third and fourth measured accelerations to the processor.

According to another aspect, a method of measuring a parameter of a body is provided. The method includes measuring a first acceleration of a rotating part of the body along a first measurement axis, measuring a second acceleration of the rotating part along a second measurement axis, measuring a third acceleration of the rotating part along a third measurement axis, measuring a fourth acceleration of the rotating part along a fourth measurement axis, and determining the parameter from the first, second, third and fourth measured accelerations.

The present disclosure further relates to an accelerometer-based sensor apparatus and method for determining the pedaling cadence, crank arm angular position and travelling speed of a bicycle. The apparatus comprises two dual-axis accelerometers mounted such that the effects of the angular velocity and acceleration of the crank arm or wheel as well as the forward velocity of the bicycle can be determined. The cadence, angular position and speed are determined directly from the accelerometer signals without the need for determining the location of consecutive maximum and minimum extreme values of the signals, consecutive changes of polarity of the signals or simplifying assumptions such as a constant rotational speed throughout the crank arm or wheel revolution. It also does not include integration of the angular acceleration signal to determine the angular velocity (cadence) or double integration of the angular acceleration signal to determine the angular position. As such, there is no requirement for a magnet and associated sensor to provide a reference or static position to reset or reinitialize the integration process to minimize the drift and accumulation errors inherent in it.

According to some embodiments, there is a sensor apparatus 1 for determining one or more of the angular displacement, angular velocity (i.e., cadence) and angular acceleration of a crank arm 15. The sensor apparatus comprises a housing 2 (or optionally, first housing 2 and second housing 2a); a first dual-axis accelerometer 3 with first and second measurement axes ($x_1$, $y_1$) arranged for providing a first signal dependent on a first acceleration along the first measurement axis ($x_1$) and a second signal dependent on a second acceleration along the second measurement axis ($y_1$); a second dual-axis accelerometer 4 with first and second measurement axes ($x_2$, $Y_2$) arranged for providing a first signal dependent on a first acceleration along the first measurement axis ($x_2$) and a second signal dependent on a second acceleration along the second measurement axis ($y_2$); a wireless transmitter 5; a receiver (e.g. antenna) 6; a power source 7; a processor 8; and an attachment mechanism 9.

The accelerometers 3 and 4, the wireless transmitter 5 and the power source 7 are contained in the housing 2 and the housing 2 contains an attachment mechanism 9 for attaching the housing 2 to the crank arm 15, the spider, the chain ring or any other rotating part of the bicycle, and wherein the sensor apparatus 1 further comprises a device for determining one or more of the angular displacement, angular velocity (i.e., cadence) and angular acceleration based on analyzing the accelerometer signals according to the methods presented herein.

The axes of the first accelerometer 3 may be arranged substantially perpendicular to each other. The axes of the second accelerometer 4 may be arranged substantially perpendicular to each other.

According to some embodiments, there is a sensor apparatus 2 for determining one or more of the angular displacement, angular velocity (i.e., cadence) and angular acceleration of a bicycle wheel. The sensor apparatus comprises a housing 2; a first dual-axis accelerometer 3 with first and second measurement axes ($x_1$, $y_1$) arranged for providing a first signal dependent on a first acceleration along the first measurement axis ($x_1$) and a second signal dependent on a second acceleration along the second measurement axis ($y_1$); a second dual-axis accelerometer 4 with first and second measurement axes ($x_2$, $y_2$) arranged for providing a first signal dependent on a first acceleration along the first measurement axis ($x_2$) and a second signal dependent on a second acceleration along the second measurement axis ($y_2$); a wireless transmitter 5; a receiver (e.g. antenna) 6; a power source 7; a processor 8; and an attachment mechanism 9.

The accelerometers 3 and 4, the wireless transmitter 5 and the power source 7 are contained in the housing 2 and the housing 2 contains an attachment mechanism 9 for attaching the housing 2 to the bicycle wheel of the bicycle, and wherein the sensor apparatus 1 further comprises a device for determining one or more of the angular displacement, angular velocity (i.e., cadence) and angular acceleration based on analyzing the accelerometer signals, and wherein the sensor apparatus 1 further comprises a device for determining one or more of the bicycle's distance travelled, speed and acceleration based on analyzing the accelerometer signals according to the methods presented herein.

The axes of the first accelerometer 3 may be arranged substantially perpendicular to each other. The axes of the second accelerometer 4 may be arranged substantially perpendicular to each other.

The accelerometers 3 and 4 may be contained in separate housings and communicate individually through either wireless or wired means to the remote unit 10. The separate housings may be positioned on the same side of the bicycle.

The individual housings may be positioned on opposite sides of the bicycle. The accelerometers 3 and 4 may be contained in separate housings and communicate individually through wireless means to the remote unit 10.

The accelerometers 3 and 4 may be contained in separate housings and communicate in a master-slave relationship individually from the first unit to the second unit and from the second unit to the remote unit 10.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various systems, apparatuses or processes will be described below to provide an example of each claimed embodiment. No embodiment described below limits any claimed embodiment and any claimed embodiment may cover systems, processes or apparatuses that differ from those described below. The claimed embodiments are not limited to systems, apparatuses or processes having all of the features of any one system, apparatus or process described below or to features common to multiple or all of the systems and apparatuses described below. It is possible that a system, apparatus or process described below is not covered by any of the claimed embodiments. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

The present disclosure describes an accelerometer-based sensor apparatus and method for determining any one or more of the pedaling cadence, crank arm angular position and travelling speed of a bicycle. The cadence, angular position and speed are determined directly from the accelerometer signals without the need for simplifying assumptions such as a constant rotational speed throughout the crank arm or wheel revolution. As such, there is also no need to determine the location of consecutive maximum and minimum extreme values or consecutive changes of polarity of the signals and there is no need for integration or differentiation of the measured sensor signals.

Figure 1:
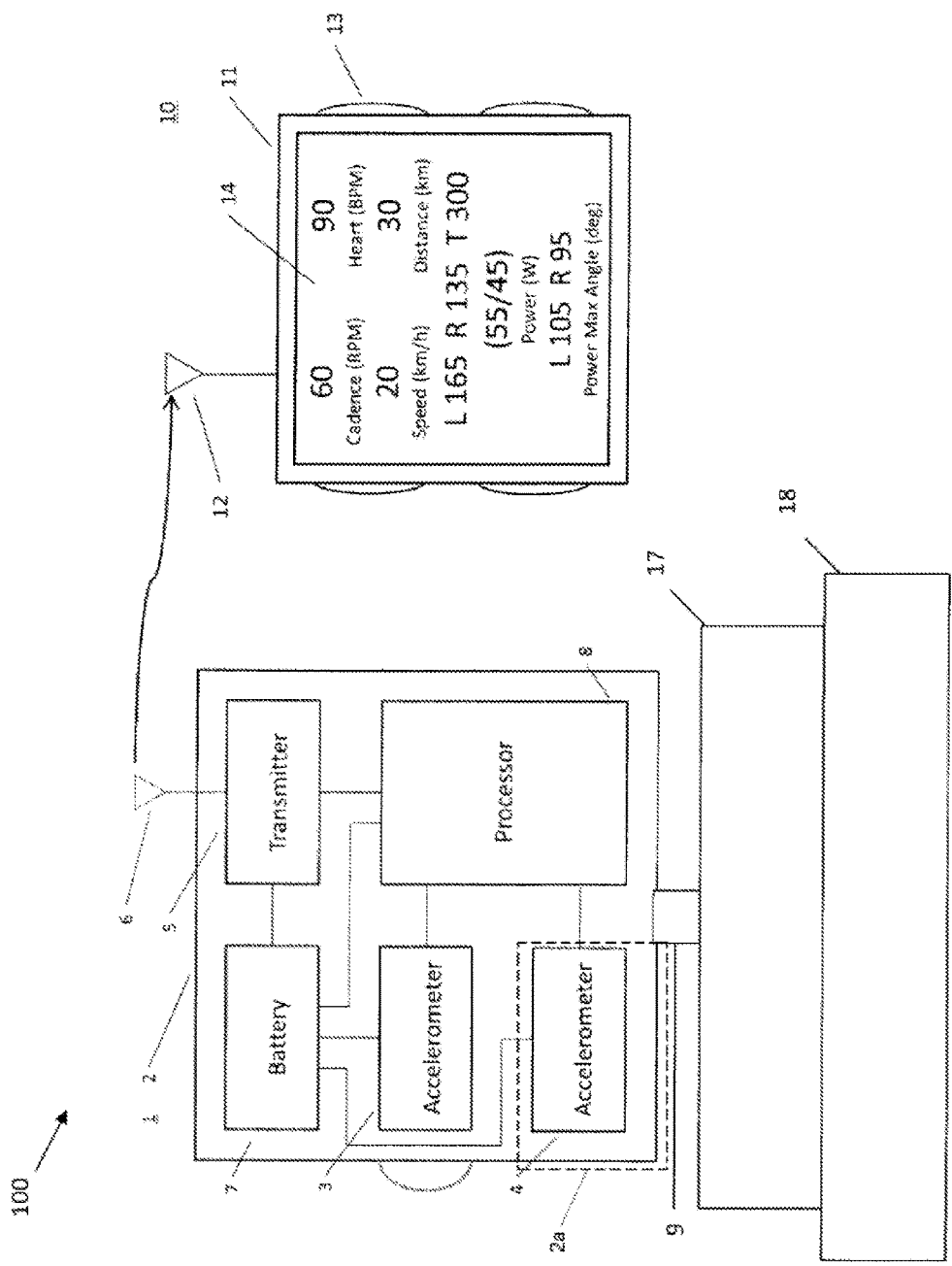
FIG. 1 shows a block diagram of a sensor apparatus and system, in accordance with an embodiment.

FIG. 1 shows a block diagram of a sensor system 100 including a sensor apparatus 1, in accordance with an embodiment. The sensor apparatus 1 includes a housing 2 (or optionally, first housing 2 and second housing 2a) which is attachable (e.g. mountable) using mechanism 9 to a rotating part 17 (e.g. a crank arm, wheel, spider or chain ring) of a body 18 (e.g. a moving body such as a bicycle). Mechanism 9 may include but is not limited to one or more flexible straps, screws, bolts, clamps or adhesives (permanent or temporary). The housing 2 contains two at least dual-axis accelerometers 3 and 4 each of which are connected to a processor 8, although the processor may alternatively be provided in the remote unit 10 which may be for example a bicycle computer, mobile phone, personal digital assistant (PDA) or other recording or computing device. The sensor apparatus 1 includes a receiver (e.g. antenna) 6 connected to a transmitter (e.g. wireless) 5 which may operate on any standard or nonstandard protocol such as ANT/ANT+, Zigbee or Bluetooth to transmit the measured accelerometer signals in either raw or processed form to the remote unit 10 by way of receiver (e.g. antenna) 12 where it may be displayed on a screen 14 or stored for later downloading to a computer and/or later processing.

The remote unit 10 has a housing 11 and may have controls 13 to select various display, configuration and processing functions. The accelerometers 3 and 4, processor 8 and transmitter 5 of the sensor apparatus 1 are powered by a battery 7 or an alternative power source. The sensor apparatus 1 may also be configured such that the accelerometers 3 and 4 may be contained in separate housings, each with its own transmitter 5, receiver (e.g. antenna) 6, processor 8 and battery 7 or alternative power source.

In accordance with an embodiment, one or both of the dual-axis accelerometers 3, 4 can be replaced by two single-axis accelerometers. In accordance with another embodiment, one or both of the dual-axis accelerometers 3, 4 can be replaced by a triple-axis (e.g. triaxial) accelerometer where one axis of the triple-axis accelerometer is either ignored or used for other purposes such as for aligning a horizontal rotating axis of a part of the body. For example, one of the axes of a triple-axis accelerometer could be used to detect if significant tilting of the body has occurred and compensate for the effective gravitational force on the x-axis and y-axis accelerometers.

Figure 2:
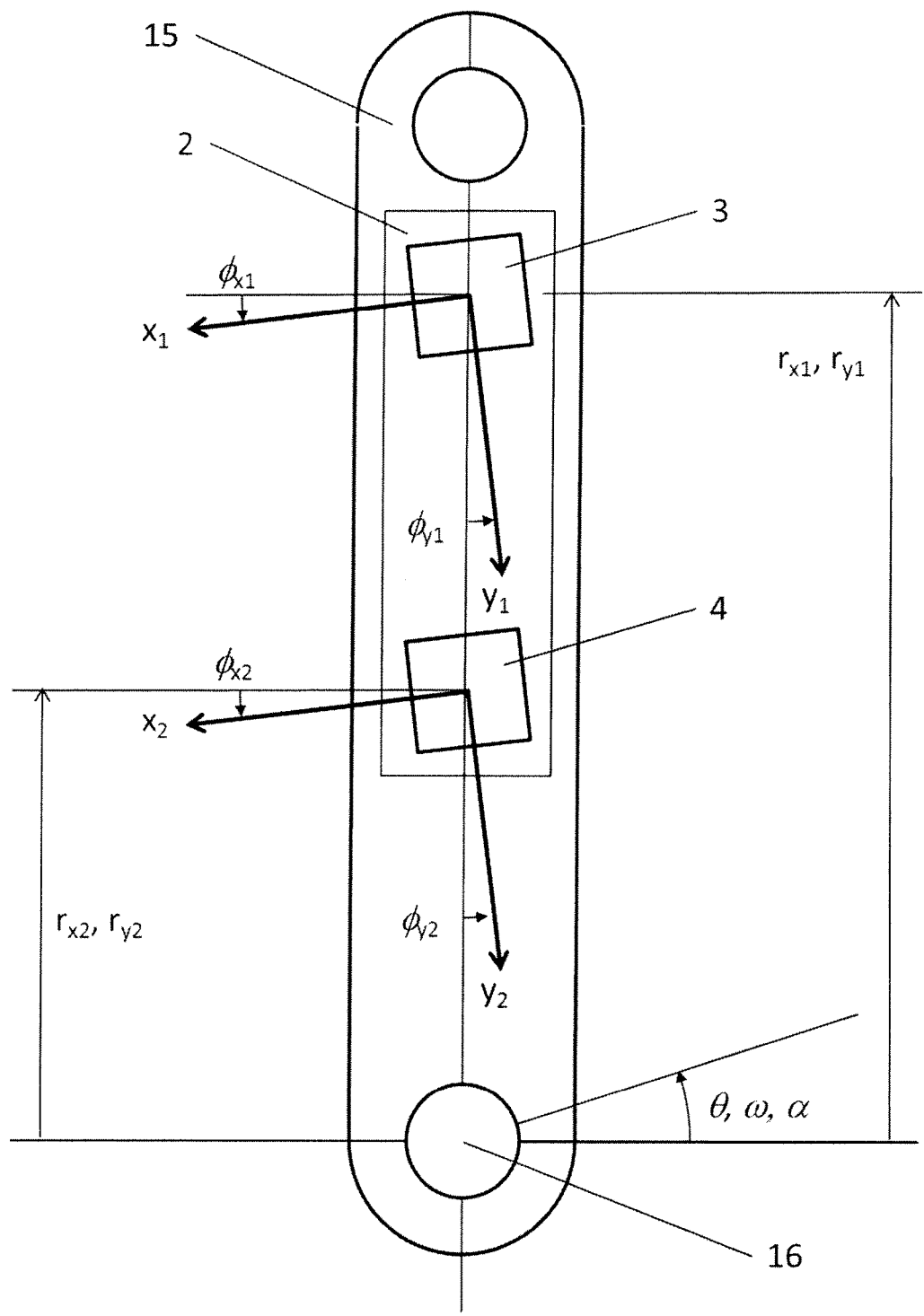
FIG. 2 shows the general installed arrangement of the sensor system, in accordance with an embodiment.

In accordance with an embodiment, there is provided on a crank arm 15 a sensor apparatus 2 comprising two dual-axis accelerometers 3 and 4 mounted as shown in FIG. 2 such that the first and second measurement axes ($x_1$, $y_1$) of the first dual-axis accelerometer 3 are arranged substantially perpendicular to one another with the first measurement axis ($x_1$) oriented substantially in the direction of the crank arm rotation (i.e., in the tangential direction) and the second measurement axis ($y_1$) oriented substantially in the direction of the center of rotation 16 of the crank arm 15 (i.e., in the radial direction), and with the measurement axes ($x_1$, $y_1$) located distances ($r_{x1}$, $r_{y1}$) from the center of rotation 16 of the crank arm 15, and such that the first and second measurement axes ($x_2$, $y_2$) of the second dual-axis accelerometer 4 are arranged substantially perpendicular to one another with the first measurement axis ($x_2$) oriented substantially in the direction of the crank arm rotation (i.e., in the tangential direction) and the second measurement axis ($y_2$) oriented substantially in the direction of the center of rotation 16 of the crank arm 15 (i.e., in the radial direction) and with the measurement axes ($x_2$, $y_2$) located distances ($r_{x2}$, $r_{y2}$) from the center of rotation 16 of the crank arm 15.

In an embodiment, the first axis ($x_1$) of the first dual-axis accelerometer 3 is arranged substantially in a radial direction of the crank arm 15 and the second axis ($y_1$) of the first dual-axis accelerometer 3 is arranged substantially in a tangential direction of the crank arm 15.

In an embodiment, a third axis ($x_2$) of the second dual-axis accelerometer 4 is arranged substantially in the radial direction of the crank arm 15 and the fourth axis ($y_2$) of the second dual-axis accelerometer 4 is arranged substantially in a tangential direction of the crank arm 15.

In an embodiment, the first dual-axis accelerometer 3 can be positioned adjacent to an axis of rotation of rotating part 17 (e.g. crank arm 15).

The preceding description and following analysis allows for the four different radial distances ($r_{x1}$, $r_{y1}$, $r_{x2}$, $r_{y2}$) just described, due to the construction of typical dual-axis MEMS (micro-electro-mechanical) accelerometers the radial distances ($r_{x1}$, $r_{y1}$) from the center of rotation 16 of the crank arm 15 would be equal, as would the radial distances ($r_{x2}$, $r_{y2}$). The preceding description and following analysis also allows for the four different orientation angles ($\emptyset_{x1}$, $\emptyset_{y1}$, $\emptyset_{x2}$, $\emptyset_{y2}$) just described, due to the construction of typical dual-axis MEMS accelerometers the orientation angles ($\emptyset_{x1}$, $\emptyset_{y1}$) would often be equal, as would the orientation angles ($\emptyset_{x2}$, $\emptyset_{y2}$). In some instances the sensor apparatus would be mounted such that these four orientation angles are zero. However, proper selection of these angles may be advantageous to balancing the magnitudes of the accelerometer signals for example to prevent or minimize accelerometer signal overload.

Figure 3:
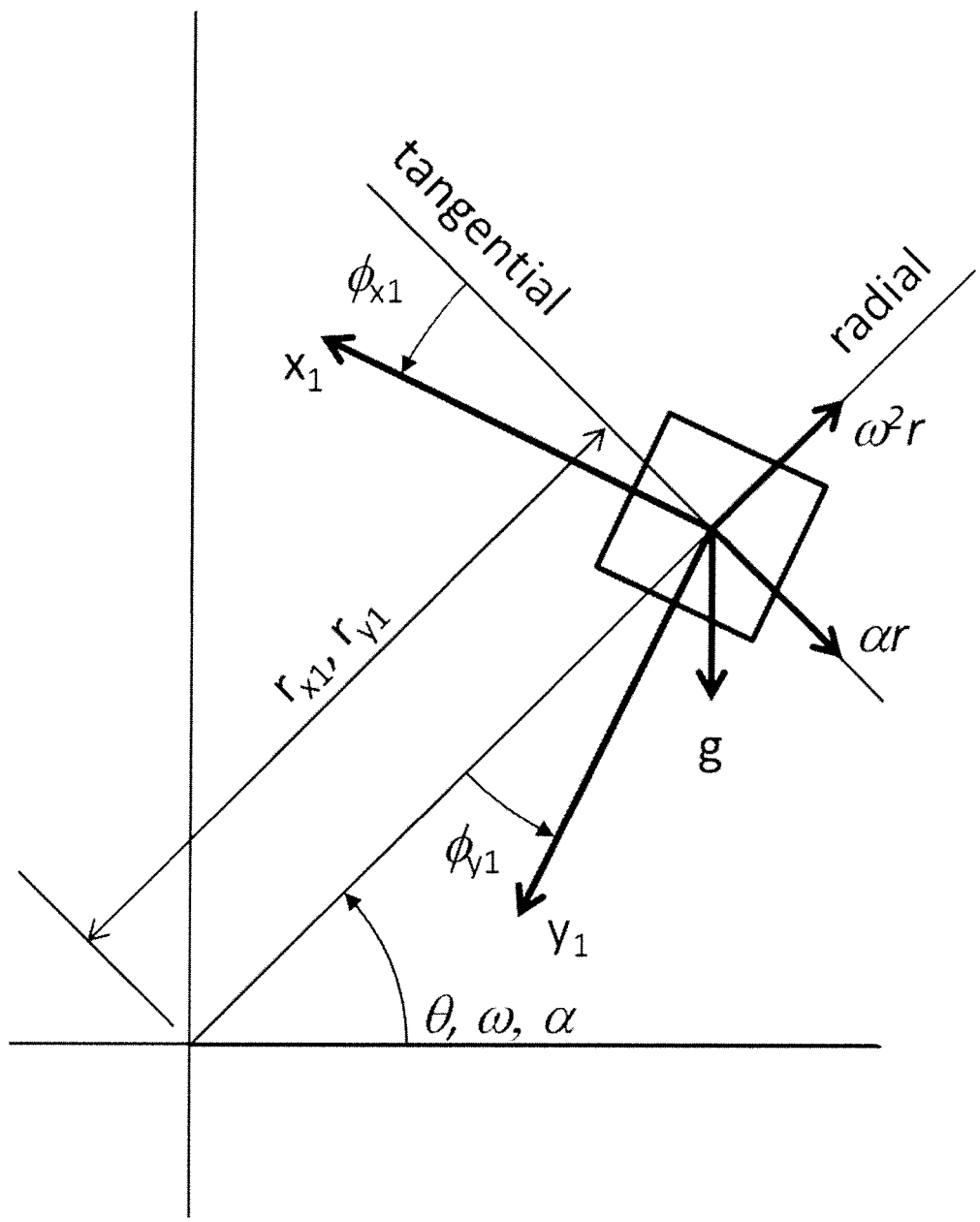
FIG. 3 shows the forces due to the gravity (q) as well as the forces due to the rotational velocity ($\omega$) and rotational acceleration ($\alpha$) on an accelerometer as it rotates about a fixed axis.

An accelerometer rotating about a fixed axis, for example on a crank arm 15 powered by a pedaling stroke, will generate a signal due to the force of gravity (g) as well as the forces due to the crank arm rotational velocity ($\omega$) and rotational acceleration ($\alpha$). These forces are shown in FIG. 3 for a dual-axis accelerometer. For simplicity the x-axis and y-axis accelerometers are shown at the same position. The force due to gravity varies with the angular position of the accelerometer as well as the angular offsets of the axes while the forces due to the angular velocity and acceleration are only affected by the angular offsets.

When a force is applied to the crank arm 15 (for example, during a pedaling motion) causing it to rotate about the center of rotation 16 the acceleration signals present on each of the dual-axis accelerometers 3 and 4 in each of the respective axes, taking into consideration not only the effects of the gravitational acceleration (g) but also the effects of the angular acceleration ($\alpha$) and angular velocity ($\omega$), as illustrated in FIG. 3, of the crank arm 15, are given by the following equations:

$$x_1 = -g\cos(\theta_{x1}+\emptyset_{x1}) - \alpha r_{x1}\cos(\emptyset_{x1}) - \omega^2 r_{x1}\sin(\emptyset_{x1})$$

$$x_2 = g\cos(\theta_{x2}+\emptyset_{x2}) - \alpha r_{x2}\cos(\emptyset_{x2}) - \omega^2 r_{x2}\sin(\emptyset_{x2})$$

$$y_1 = g\cos(\theta_{y1}+\emptyset_{y1}) - \omega^2 r_{y1}\cos(\emptyset_{y1}) + \alpha r_{y1}\sin(\emptyset_{y1})$$

$$y_2 = g\cos(\theta_{y2}+\emptyset_{y2}) - \omega^2 r_{y2}\cos(\emptyset_{y2}) + \alpha r_{y2}\sin(\emptyset_{x1})$$

where the angles ($\emptyset$) represent the degree to which the respective accelerometer axes are offset from their substantial tangential and radial orientations, the angles ($\theta$) are the angular displacements, and the subscripts 1 and 2 refer to the first 3 and second 4 dual-axis accelerometer, respectively as previously described. Using algebraic methods and trigonometric identities these equations can be rearranged to the standard matrix form:

$$[A]\{x\}=\{b\}$$

where the terms are defined as:

$$[A] = \begin{bmatrix} -g\cos(\emptyset_{x1}) & g\sin(\emptyset_{x1}) & -r_{x1}\cos(\emptyset_{x1}) & -r_{x1}\sin(\emptyset_{x1}) \\ -g\cos(\delta_{x2}+\emptyset_{x2}) & g\sin(\delta_{x2}+\emptyset_{x2}) & -r_{x2}\cos(\emptyset_{x2}) & -r_{x2}\sin(\emptyset_{x2}) \\ g\sin(\delta_{y1}+\emptyset_{y1}) & g\cos(\delta_{y1}+\emptyset_{y1}) & r_{y1}\sin(\emptyset_{y1}) & -r_{y1}\cos(\emptyset_{y1}) \\ g\sin(\delta_{y2}+\emptyset_{y2}) & g\cos(\delta_{y2}+\emptyset_{y2}) & r_{y2}\sin(\emptyset_{y2}) & -r_{y2}\cos(\emptyset_{y2}) \end{bmatrix}$$

$$\{x\} = \begin{Bmatrix} \cos(\theta) \\ \sin(\theta) \\ \alpha \\ \omega^2 \end{Bmatrix}$$

$$\{b\} = \begin{Bmatrix} x_1 \\ x_2 \\ y_1 \\ y_2 \end{Bmatrix}$$

the terms ($\delta$) defined as the difference between the angular displacements of the two accelerometers 3 and 4:

$$\delta_{x1}=\theta_{x2}-\theta_{x1}$$

$$\delta_{y1}=\theta_{y1}-\theta_{x1}$$

$$\delta_{y2}=\theta_{y2}-\theta_{x1}$$

have been introduced and the angular position ($\theta_{x1}$) has been replaced by a generic angular position ($\theta$).

This system of equations can now be solved for the unknowns in the vector $\{x\}$. This provides a direct solution for the angular velocity ($\omega$) and the angular acceleration ($\alpha$) without any simplifying assumptions such as constant angular velocity (i.e., cadence). The angular displacement ($\theta$) can be calculated by combining the sine and cosine terms in the solution vector $\{x\}$ without resorting to any integration of the measured sensor signals and thereby avoiding the inherent inaccuracy of the integration process. The parameters in the matrix [A] are chosen such that the four equations are independent (i.e., the two accelerometers 3 and 4 cannot be located at the same position and orientation).

The two accelerometers 3 and 4 are not located at the same position and orientation. There are many other practical configurations for the placements of the accelerometers 3 and 4 which will ensure that the four equations governing the measured accelerometer signal levels are independent and therefore can be solved. Proper selection of these position and orientation angles may be advantageous to balancing the magnitudes of the accelerometer signals for example to prevent or minimize accelerometer signal overload. Some configurations of the sensor system will have analytical solutions for the parameters in the vector $\{x\}$ and using these analytical solutions may simplify the solution process and minimize the solution time.

Figure 4:
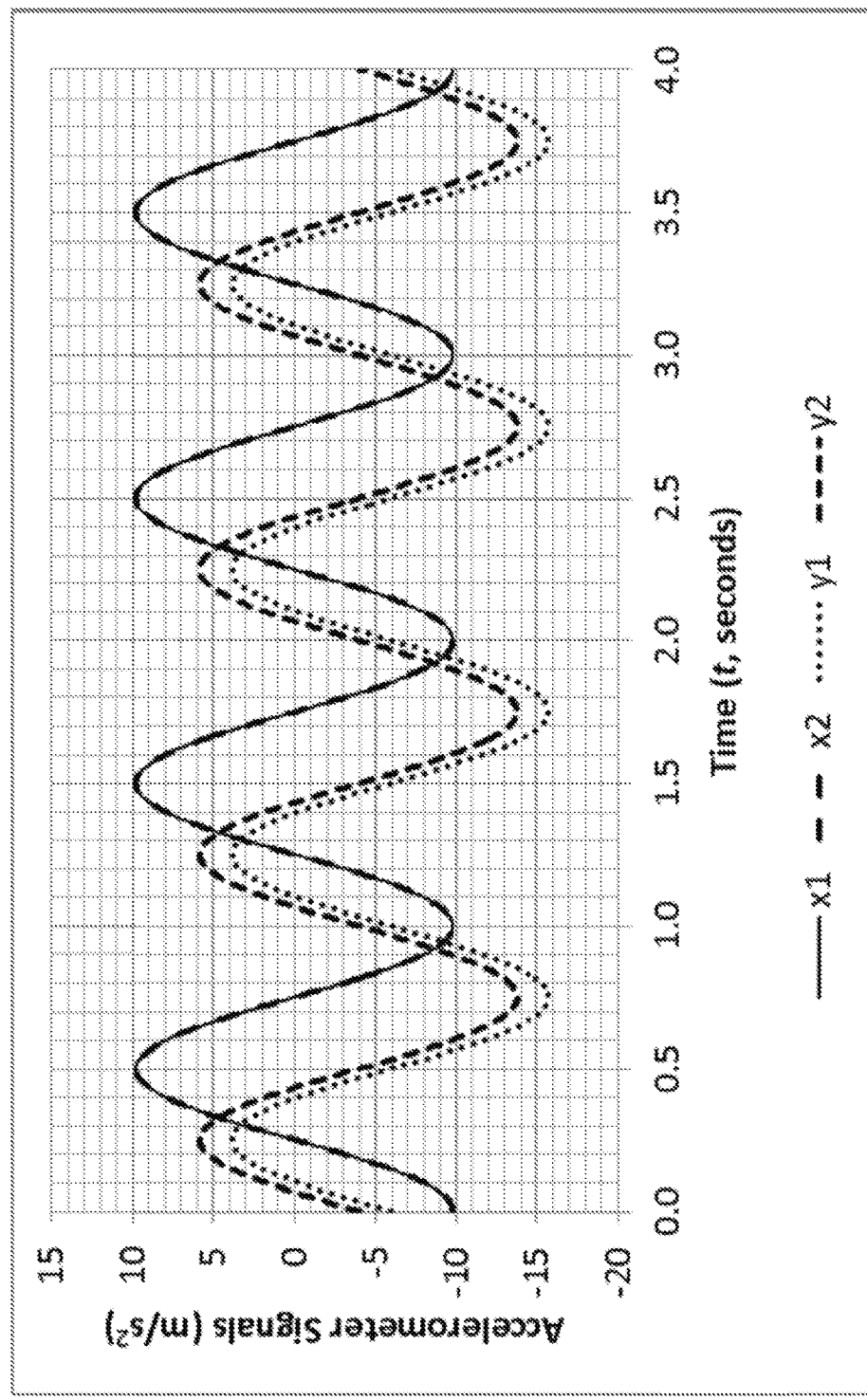
FIG. 4 shows an exemplary graph of the accelerometer signals for the sensor system shown in FIG. 2.

The present disclosure will now be illustrated using a few exemplary embodiments which are to be considered in all respects as being only illustrative and not restrictive. FIG. 4 shows the accelerometer signals for four complete revolutions of a sensor apparatus 1 as presented in the present disclosure where the orientation angles ($\emptyset$) are zero, the angular displacement differences ($\delta$) are zero, the distances ($r_{x1}$, $r_{y1}$) from the center of rotation 16 of the crank arm 15 are both 150 mm, the distances ($r_{x2}$, $r_{y2}$) from the center of rotation 16 of the crank arm 15 are both 100 mm, and the cadence (equivalent to the rotational speed $\omega$) is constant at 60 RPM (1 revolution per second), and the crank arm initial angular position is 0 degrees. With these parameter values the x-axis accelerometer signals ($x_1$, $x_2$) are identical, since both are affected by the gravity force only, while the y-axis accelerometer signals ($y_1$, $y_2$) are in phase but of different magnitude due to the effects of the angular velocity ($\omega$) and different radial distances ($r_{y1}$, $r_{y2}$) from the center of rotation 16 of the crank arm 15. It is also evident in FIG. 4 that the minima and maxima of the accelerometer signals are evenly spaced in time due to the constant angular velocity and that there is a ninety degree shift in phase (0.25 seconds corresponding to 60 RPM or 1 revolution per second or 360 degrees per second) between the x-axis and y-axis signals.

Figure 5:
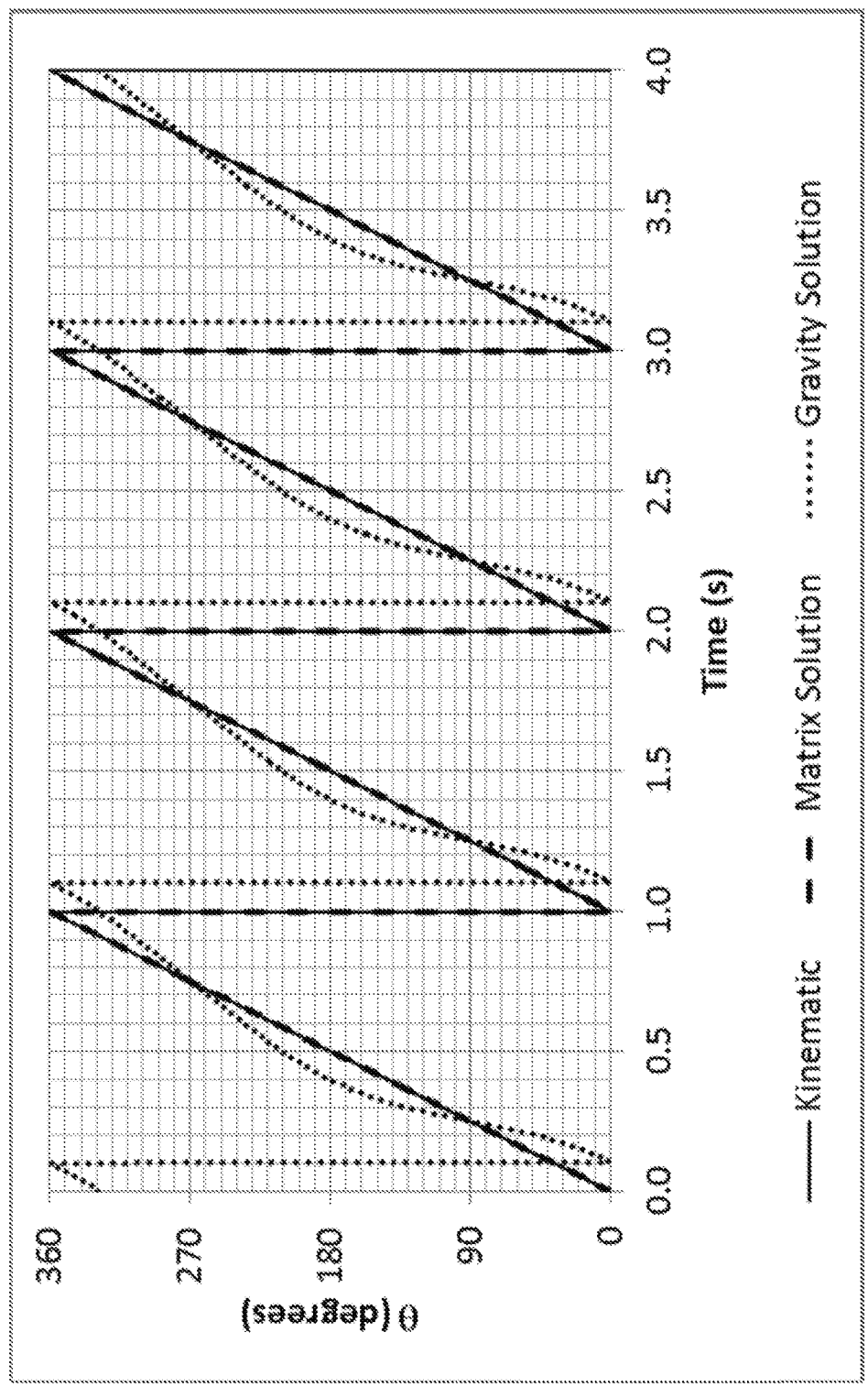
FIG. 5 shows an exemplary graph of the angular position determined from the data in FIG. 4 using the analysis method according to the present disclosure.

Solving the matrix equations with the data from FIG. 4 produces the expected values of 60 RPM for the angular velocity ($\omega$), zero for the angular acceleration ($\alpha$) and the linearly increasing angular displacement ($\theta$) shown in FIG. 5 which is the same as the crank arm angular position since the first accelerometer 3 is located directly on it. In embodiments in which the angular position ($\theta$) of the accelerometer 3 is not coincident with the crank arm angular position a known offset would be applied to the angular displacement ($\theta$) results. In FIG. 5, and all subsequent graphs for the angular displacement ($\theta$), the comparison data labelled "Kinematic" is calculated by the standard equation:

$$\theta = \theta_0 + \omega_0 t + \frac{1}{2}\alpha t^2$$

where $\theta_0$ is the initial angular displacement in radians (zero in this example), $\omega_0$ is the initial angular velocity in radians per second ($2\pi$ in this example), $\alpha$ is the angular acceleration in radians per second per second (zero in this example) as previously defined and t is the time in seconds (from zero to four seconds in this example).

FIG. 5 also shows the angular position ($\theta$) calculated from the accelerometer signals ($x_1$, $y_1$) using the equation:

$$\tan\theta = -\frac{y_1}{x_1}$$

assuming they were due to only gravity where the negative sign is present due to the axes orientations chosen. It is evident from FIG. 5 that this method, referred to in FIG. 5 and subsequent graphs as the "Gravity Solution", results in an error in the angular position and it is also evident from the preceding analysis that this error increases with the distance of the accelerometer from the center of rotation and also with the cadence since the contribution of the linear acceleration effects becomes more significant relative to the gravity terms. In this example, at least the cadence determined from successive minima and/or maxima and polarity changes in the accelerometer signals ($x_1$, $y_1$) would still be correct since the cadence is constant.

Figure 6:
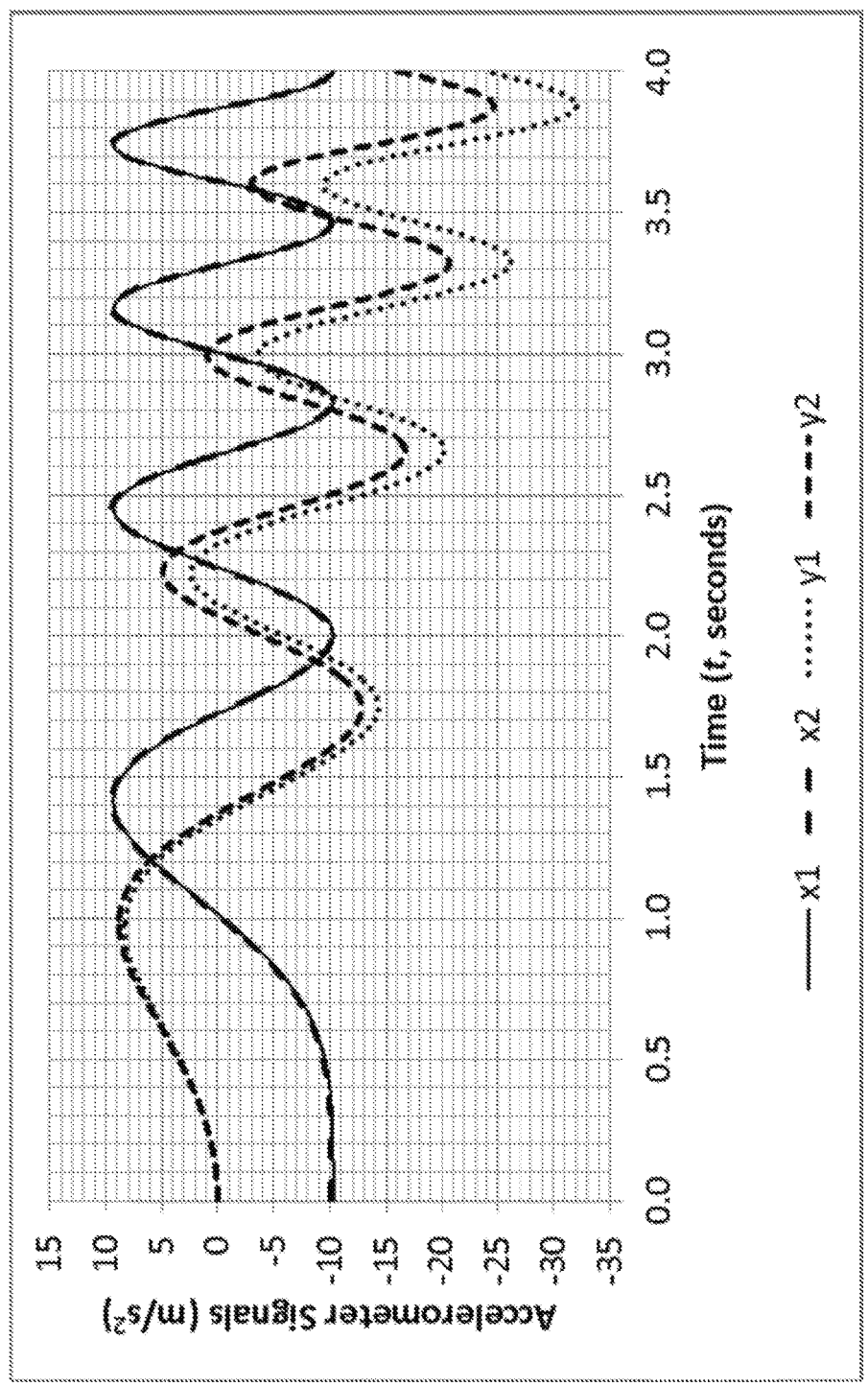
FIG. 6 shows an exemplary graph of the accelerometer signals for a further embodiment of the sensor system according to the present disclosure.

FIG. 6 illustrates the accelerometer signals for four complete revolutions of a sensor apparatus 1 identical to the one just described but with initial and final angular velocities of the crank arm 15 of zero and 120 RPM, respectively, corresponding to an angular acceleration ($\alpha$) of $\pi$ radians per second per second. By comparing the accelerometer signals in FIG. 6 with those in FIG. 4 it is evident that a nonzero angular acceleration ($\alpha$) further complicates the nature of the accelerometer signals and also leads to signal levels with larger magnitudes. It is also evident in FIG. 6 that the minima and maxima of the accelerometer signals are no longer evenly spaced in time as they were in the previous example due to the linearly increasing angular velocity and that the y-axis signals are increasing in magnitude due to the increasing angular velocity.

Solving the matrix equations with the data from FIG. 6 produces the expected linearly increasing values for the angular velocity ($\omega$), from zero to 120 RPM, a constant angular acceleration ($\alpha$) of a radians per second per second, and a nonlinearly increasing angular displacement ($\theta$) shown in FIG. 7 which again is the same as the crank arm angular position since the first accelerometer 3 is located directly on it. The increasing angular velocity ($\omega$) is also evident in the decreasing time for each complete revolution as illustrated in FIG. 7.

Figure 7:
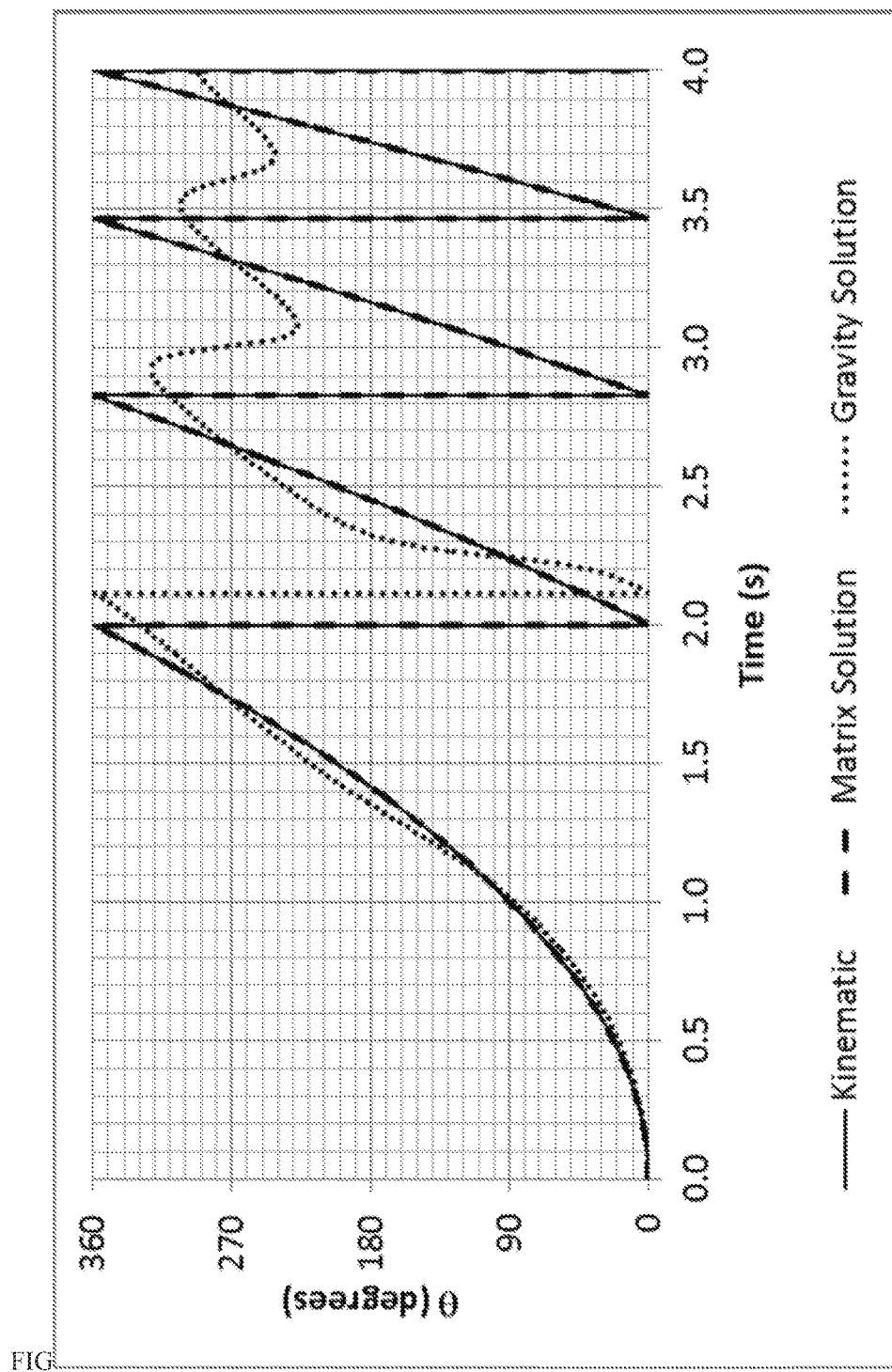
FIG. 7 shows an exemplary graph of the angular position determined from the data in FIG. 6 using the analysis method according to the present disclosure.

FIG. 7 also shows the angular position calculated from the accelerometer signals ($x_1$, $y_1$) assuming it was due to only gravity using the method previously described for and used in FIG. 5. It is evident once again from FIG. 7 that this method results in an error in the angular position and that this error increases with the cadence. It is also evident in this example that the instantaneous cadence cannot be determined from successive minima and/or maxima and polarity changes in the accelerometer signals ($x_1$, $y_1$) since the cadence is not constant.

Figure 8:
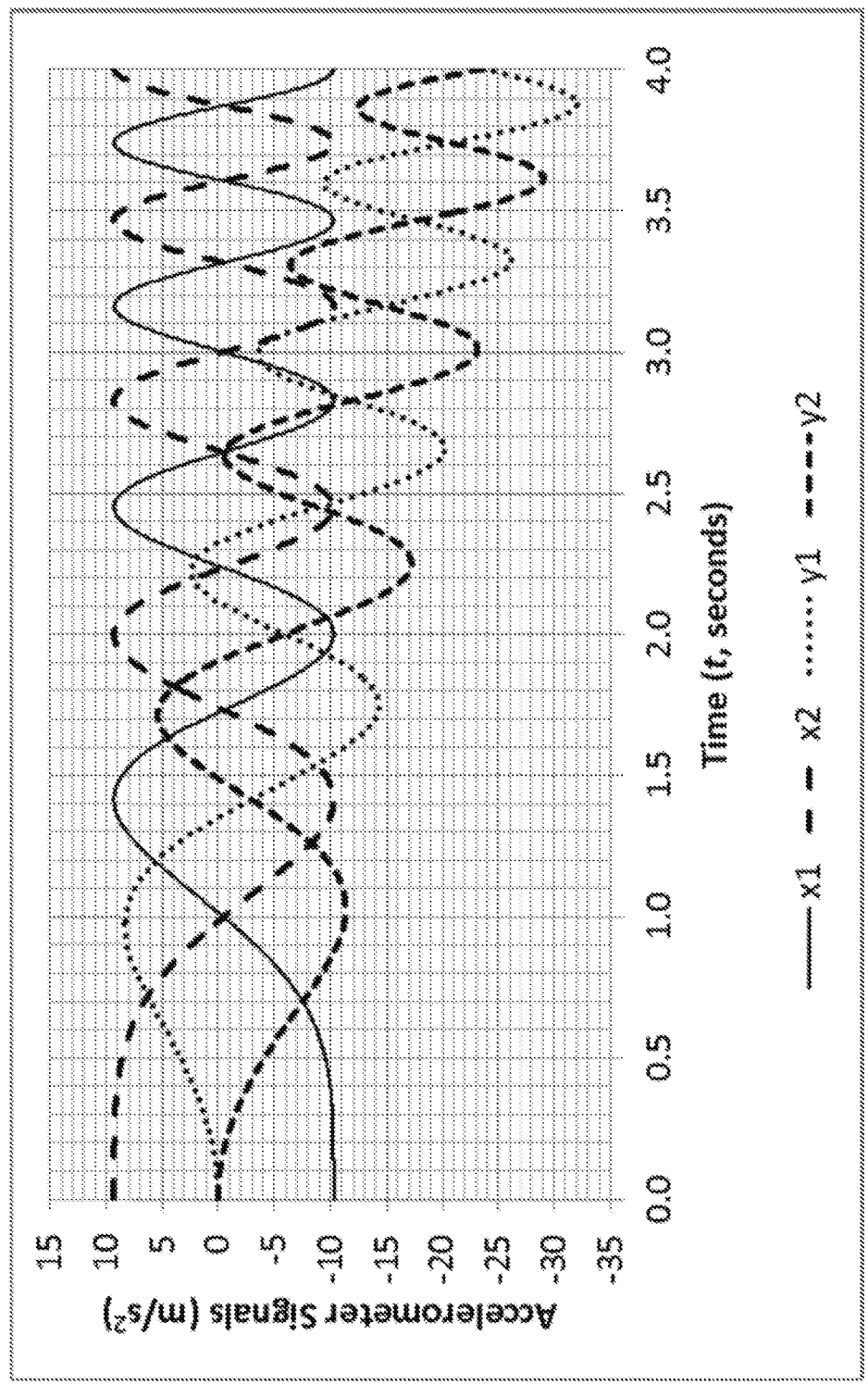
FIG. 8 shows an exemplary graph of the accelerometer signals for a further embodiment of the sensor system according to the present disclosure.

FIG. 8 illustrates the accelerometer signals for four complete revolutions of a sensor apparatus 1 similar to the one just described but with the second accelerometer 4 offset by 180 degrees from the first accelerometer 3 (i.e., $\delta_{x2}=\delta_{y2}=\pi$) and both accelerometers located at radial distances ($r_{x1}$, $r_{y1}$, $r_{x2}$, $r_{y2}$) of 0.15 m from the center of rotation 16 of the crank arm 15. Such a configuration might be constructed by placing the individual accelerometers 3,4 in separate housings (e.g. each housing having a processor and wireless transmitter) on opposite crank arms or on the spider of the crank system. Although the accelerometer signals shown in FIG. 8 are significantly different than those in FIG. 6, solving using the matrix equations produces identical results for the angular velocity ($\omega$), angular acceleration ($\alpha$), and angular position ($\theta$) as was shown previously in FIG. 7, all of which agree exactly with those calculated from the kinematic equations. As was shown previously in FIG. 7 the "Gravity Solution" for the angular velocity ($\omega$) and angular position ($\theta$) is inaccurate, especially as the cadence increases.

In a further embodiment of the present disclosure the dual-axis accelerometers 3 and 4 are contained in separate housings and communicate either one to the other in a master-slave configuration with the master then communicating to the remote unit 10 or the dual-axis accelerometers 3 and 4 may communicate individually to the remote unit 10 Communication between the separate housings and communication between each of the housings and the remote unit 10 may be wired or wireless. In such an embodiment the two separate housings may be placed on (e.g. mounted to) a single part of the body (e.g. at separate locations of one part) or placed on (e.g. mounted to) separate parts of the body. The separate parts of the body may be on the same or opposite sides of the body (e.g. bicycle). One embodiment of this configuration would have one of the dual-axis accelerometers contained in a housing near the left pedal and the other dual-axis accelerometer contained in a housing near the right pedal as may be known in the art for pedal-based bicycle power meters. The distance of the accelerometers 3 and 4 from the center of rotation 16 (e.g. rotation axis) of the crank arm 15 could be determined from the length of the crank arm 15 and the position of the accelerometers in the housings and entered into the bicycle computer or other power monitoring device 10 at the time of setup and calibration of the power meter. For such a configuration the dual-axis accelerometer on the right side of the bicycle (say, accelerometer 4) could be specified to be offset by 180 degrees from the first accelerometer 3 (i.e., $\delta_{x2}=\delta_{y2}=\pi$). It could also be specified to have orientation angles ($\emptyset_{x2}$, $\emptyset_{y2}$) of 180 and 0 degrees, respectively, depending on how it is aligned within the housing and how the housing is aligned relative to the crank arm.

Figure 9:
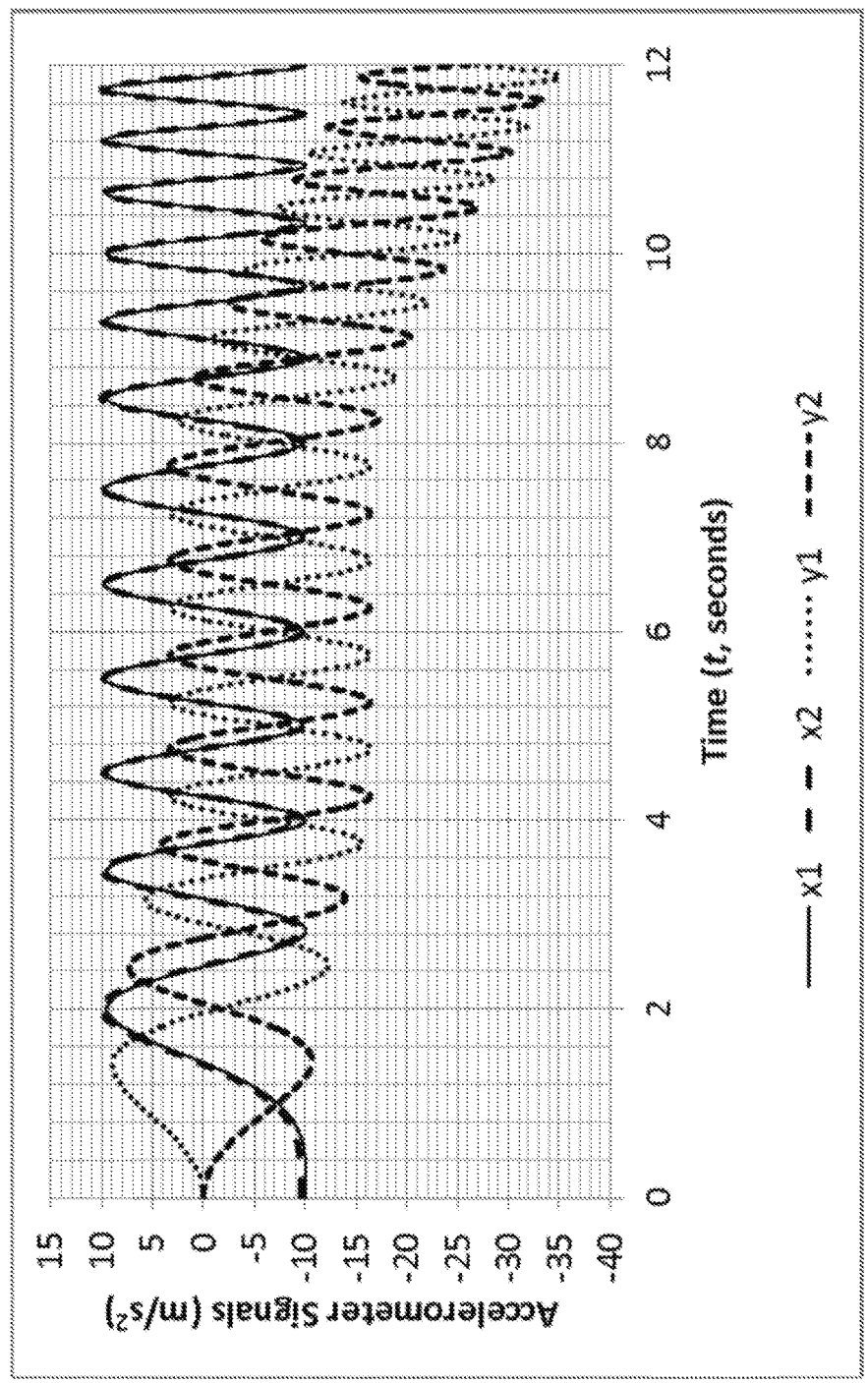
FIG. 9 shows an exemplary graph of the accelerometer signals for a further embodiment of the sensor system according to the present disclosure.
Figure 10:
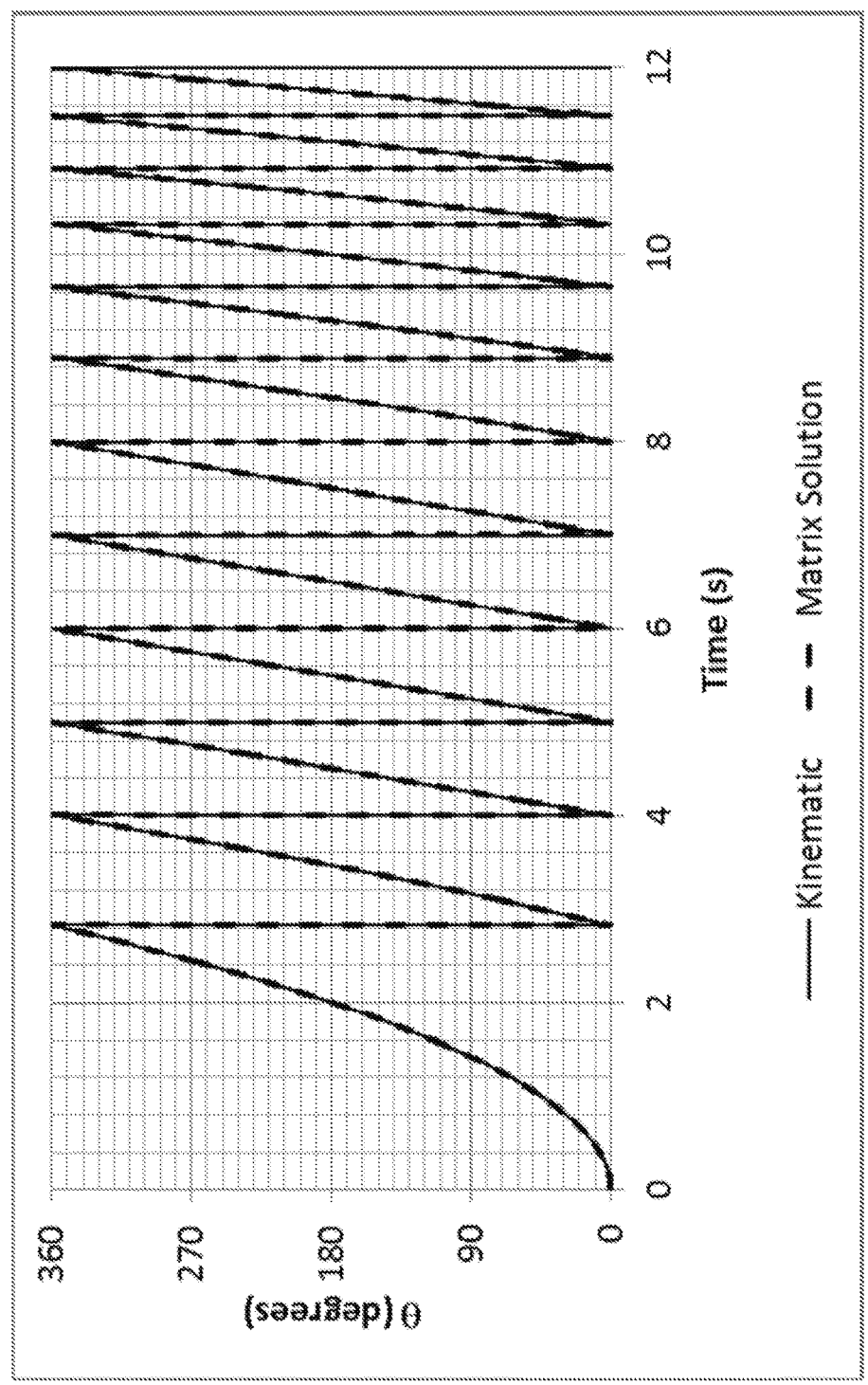
FIG. 10 shows an exemplary graph of the angular position determined from the data in FIG. 9 using the analysis method according to the present disclosure.

FIG. 9 illustrates the accelerometer signals for twelve complete revolutions of a sensor apparatus 1 identical to the one just described undergoing angular acceleration for four seconds from initial to final angular velocities of 0 and 60 RPM, respectively, four seconds of constant angular velocity of 60 RPM and then a further four seconds of angular acceleration from initial to final angular velocities of 60 and 120 RPM, respectively. The corresponding angular position ($\theta$) obtained by solving the matrix equations is shown in FIG. 10 and agree exactly with those calculated from the kinematic equations.

This sensor apparatus 1 will work as well when placed on a wheel of a bicycle to determine the rotational speed of the wheel and when coupled with the wheel diameter can be used to determine the bicycle's forward speed and total distance travelled thereby functioning as a speedometer and odometer. This sensor apparatus 1 can be used when on the crank arm of a bicycle to determine the cadence and angular position as used in the calculation of the power as measured by a bicycle power meter. This sensor apparatus can be used when placed on the crank arm of a bicycle to determine the cadence and angular position used as the triggering mechanism in a system incorporating a Functional Electrical Stimulation (FES) system as used for example to stimulate the leg muscles of a disabled person on a bicycle or bicycle-like apparatus or to stimulate the arm muscles of a disabled person using a hand-cycling bicycle or bicycle-like apparatus.

Functional Electrical Stimulation (FES), sometimes referred to as Neuromuscular Electrical Stimulation (NMES), involves the application of electrical pulses to either nerves or muscles to cause muscle contraction when a damaged central nervous system is unable to provide a proper stimulus signal. Numerous devices, known as neuroprostheses, incorporating FES have been developed to improve the health of people with disabilities. One such device is a FES bike. These bikes typically take the form of a stationary leg-cycle (ergometer), some of which may be wheelchair compatible. Some of these devices may also include hand-cycling capability.

The FES pulses which are applied to the legs, or to the arms in the case of a hand-cycle, involve various nerve or muscle groups and different stimuli may be applied to the left and right legs, or the left and right arms in the case of a hand-cycling device, depending on the level of impairment of the individual's central nervous system. These pulses must be timed precisely to coordinate the stimulus with the pedaling or cranking motion. This timing typically involves the use of a rotary encoder on the device to track the motion of the crank arm. Such encoders require both a stationary and a moving component and are not easily transferable between devices. The timing information is also typically transmitted from the sensor system to the stimulus system through a wired connection, also significantly limiting the transferability between devices.

The present disclosure may overcome these transferability drawbacks through the use of an accelerometer-based sensor system to replace the rotary encoder and the use of a wireless connection between the sensor and stimulus systems.

The sensor system described herein, or the stimulus system based on information supplied by the sensor system, determines the angular position of the crank arm through the means previously described. Based on this information the stimulus system determines the appropriate characteristics of the stimulus signal and applies the stimulus signal to the appropriate nerve/muscle group. The sensor system, or the stimulus system based on information supplied by the sensor system, using proper kinematic relationships as are known in the art, may also predict a future angular position depending on the current position, the angular velocity and the angular acceleration. This may be used to compensate for delays in transferring the sensor information to the stimulus system or for delays in applying or removing the stimulus signal.

Further, although described in connection with a bicycle crank arm to determine crank arm cadence and crank arm angular position, and in connection with a bicycle wheel to determine wheel cadence, wheel angular position and bicycle forward speed, the concepts described herein are not necessarily limited to that context. For example, the concepts are not necessarily restricted to use with bicycles. The accelerometer signals may be generated by accelerometers placed on any device having a horizontal rotating axis and the accelerometer signals may be received and/or processed by any other apparatus. For example, additional uses for the sensor apparatus and systems described herein may include as a wind turbine performance analysis and reporting system or as a speedometer/odometer or antilock braking system in a vehicle.

In another embodiment, a method of measuring a parameter of a body is provided. The method includes measuring a first acceleration of a rotating part of the body along a first measurement axis; measuring a second acceleration of the rotating part along a second measurement axis; measuring a third acceleration of the rotating part along a third measurement axis; measuring a fourth acceleration of the rotating part along a fourth measurement axis; and determining the parameter from the first, second, third and fourth measured accelerations.

While the above description provides examples of one or more apparatus, methods, or systems, it will be appreciated that other apparatus, methods, or systems may be within the scope of the claims as interpreted by one of skill in the art.

What is claimed is:

1. A sensor system for measuring a parameter of a body, the sensor system comprising:
    a housing mountable to a rotating part of the body, the housing comprising:
        a first dual-axis accelerometer having a first measurement axis and a second measurement axis, the first dual-axis accelerometer arranged to measure a first acceleration along the first measurement axis and a second acceleration along the second measurement axis; and
        a second dual-axis accelerometer having a third measurement axis and a fourth measurement axis, the second dual-axis accelerometer arranged to measure a third acceleration along the third measurement axis and a fourth acceleration along the fourth measurement axis; and
    a processor configured to:
        receive the first, second, third and fourth measured accelerations; and
        determine directly from the first, second, third and fourth measured accelerations, the parameter, without the use of approximation, integration, differentiation, maximum or minimum extreme values or consecutive changes of polarity of the accelerations.

2. The sensor system of claim 1, wherein the parameter is one of angular position, angular velocity and angular acceleration of the rotating part.

3. The sensor system of claim 2, wherein a distance traveled, forward speed or forward acceleration of the body is determined from one or more of the angular position, angular velocity and angular acceleration of the rotating part.

4. The sensor system of claim 1, wherein the body is one of a bicycle, a car, a turbine motor or a Functional Electrical Stimulation (FES) system.

5. The sensor system of claim 1, wherein the body is a bicycle and the rotating part is a crank arm, a wheel, a spider, or a chain ring.

6. The sensor system of claim 1, wherein the first and second axes of the first dual-axis accelerometer are arranged substantially perpendicular to each other and the third and fourth axes of the second dual-axis accelerometer are arranged substantially perpendicular to each other.

7. The sensor system of claim 1, wherein the rotating part is a crank arm and the first axis of the first dual-axis accelerometer is arranged substantially in a radial direction of the crank arm and the second axis of the first dual-axis accelerometer is arranged substantially in a tangential direction of the crank arm.

8. The sensor system of claim 7, wherein the third axis of the second dual-axis accelerometer is arranged substantially in the radial direction of the crank arm and the fourth axis of the second dual-axis accelerometer is arranged substantially in a tangential direction of the crank arm.

9. The sensor system of claim 1, wherein the housing further comprises a transmitter coupled to the first and second dual-axis accelerometers, the transmitter configured to receive the first, second, third and fourth measured accelerations from the first and second dual-axis accelerometers and transmit the first, second, third and fourth measured accelerations to the processor.

10. The sensor system of claim 1, wherein the first dual-axis accelerometer is positioned adjacent to an axis of rotation of the rotating part.

11. The sensor system of claim 10, wherein the processor determines an angular position of the rotating part from the first and second measured accelerations of the first dual-axis accelerometer.

12. The sensor system of claim 11, wherein the processor determines an angular velocity of the rotating part from a rate of change of the angular position.

13. The sensor system of claim 12, wherein the processor determines an angular acceleration of the rotating part from a rate of change of the angular velocity.

14. The sensor system of claim 11, wherein the processor determines an angular velocity of the rotating part from the angular position and the third and fourth measured accelerations of the second dual-axis accelerometer.

15. The sensor system of claim 11, wherein the processor determines an angular acceleration of the rotating part from the angular position and the third and fourth measured accelerations of the second dual-axis accelerometer.

16. A sensor system for measuring a parameter of a body, the sensor system comprising:
- a first housing mountable to the body, the first housing comprising a first dual-axis accelerometer having a first measurement axis and a second measurement axis, the first dual-axis accelerometer arranged to measure a first acceleration along the first measurement axis and a second acceleration along the second measurement axis;
- a second housing mountable to the body, the second housing comprising a second dual-axis accelerometer having a third measurement axis and a fourth measurement axis, the second dual-axis accelerometer arranged to measure a third acceleration along the third measurement axis and a fourth acceleration along the fourth measurement axis; and
- a processor configured to:
  - receive the first, second, third and fourth measured accelerations; and
  - determine directly from the first, second, third and fourth measured accelerations, the parameter, without the use of approximation, integration, differentiation, maximum or minimum extreme values or consecutive changes of polarity of the accelerations.

17. The sensor system of claim 16, wherein the first housing further comprises a first transmitter coupled to the first dual-axis accelerometer and the second housing further comprises a second transmitter coupled to the second dual-axis accelerometer;
wherein the first transmitter is configured to receive the first and second measured accelerations from the first dual-axis accelerometer and transmit the first and second measured accelerations to the processor and the second transmitter is configured to receive the third and fourth measured accelerations from the second dual-axis accelerometer and transmit the third and fourth measured accelerations to the processor.

18. The sensor system of claim 16, wherein the first housing is mounted at a first location to a rotating part of the body and the second housing is mounted at a second location to the rotating part of the body.

19. The sensor system of claim 18, wherein the first housing and the second housing are mounted to a same side of the rotating part.

20. The sensor system of claim 18, wherein the first housing and the second housing are mounted to opposite sides of the rotating part.

21. The sensor system of claim 16, the first housing further comprising a first transmitter coupled to the first dual-axis accelerometer and the second housing further comprising a second transmitter coupled to the second dual-axis accelerometer, and a receiver;
wherein the first transmitter is configured to receive the first and second measured accelerations from the first dual-axis accelerometer and wirelessly transmit the first and the second measured accelerations to be received by the receiver, and the second transmitter is configured to receive the first and second measured accelerations from the receiver, receive the third and fourth measured accelerations from the second dual-axis accelerometer and transmit the first, second, third and fourth measured accelerations to the processor.

22. A method of measuring a parameter of a body, the method comprising:
- measuring a first acceleration of a rotating part of the body along a first measurement axis;
- measuring a second acceleration of the rotating part along a second measurement axis;
- measuring a third acceleration of the rotating part along a third measurement axis;
- measuring a fourth acceleration of the rotating part along a fourth measurement axis; and
- determining the parameter directly from the first, second, third and fourth measured accelerations, without the use of approximation, integration, differentiation, maximum or minimum extreme values or consecutive changes of polarity of the accelerations.

* * * * *